United States Patent Office 3,542,908
Patented Nov. 24, 1970

3,542,908
METHOD OF MANUFACTURING A REVERSE OSMOSIS MEMBRANE
Allan Sharples and George Thomson, Edinburgh, England, assignors, by mesne assignments, to the United States of America as represented by the Secretary of the Interior
No Drawing. Filed Mar. 22, 1968, Ser. No. 715,136
Int. Cl. B29d 7/02, 7/20
U.S. Cl. 264—49                                                4 Claims

ABSTRACT OF THE DISCLOSURE

Novel reverse osmosis membranes are prepared by copolymerizing a hydrophobic and a hydrophilic monomer after rendering the hydrophilic monomer temporarily hydrophobic. After polymerization the hydrophilic portion of the copolymer is re-established. Casting dopes containing the copolymer, a solvent, and water may be formed into asymmetric membranes by casting on a smooth surface followed by immersing in water. Conventional swelling agents may be added to the dope if desired. A reverse osmosis membrane of this type is formed from a galactose methacrylate-methyl methacrylate copolymer.

---

This invention resulted from work done under Contract No. 14-01-0001-741 with the Office of Saline Water of the Department of the Interior and the domestic title to the invention is in the Government.

BACKGROUND OF INVENTION

Field of invention

The present invention relates to the field of saline water conversion by reverse osmosis and to the preparation of reverse osmosis membranes.

Description of prior art

Reverse osmosis is now a recognized means of separating the various components of a multi-component solution. It has found utility in water conversion, water conservation, food concentration, chemical recoveries, pollution control and molecular separations. The largest potential use for reverse osmosis remains in the field of saline water conversion and more particularly the conversion of inland brackish waters into a demineralized and potable product.

A large variety of membrane materials have been developed to date. The development of the art of reverse osmosis and of membrane compositions and manufacture may be traced by reference to Office of Saline Water Research and Development Progress Reports Nos. 16, 61, 69, 83, 84, 111 and 117, available from the Clearinghouse for Federal Scientific and Technical Information, and Office of Saline Water Research and Development Progress Reports Nos. 143, 144, 149, 150, 153, 154, 167, 177, 185, 206, 208, 213, 220, 224, 232, and 240, available from the Superintendent of Documents, U.S. Government Printing Office, Washington, D.C. A preponderance of the membrane materials described in the prior art are designed to desalinate seawater, that is, a water of high sodium content. It has been the general experience of the art that membranes so designed have low flux rates. Since, however, a much greater need is present for the use of reverse osmosis in the demineralization of inland waters which are generally of lower sodium content and higher calcium and magnesium content, there is a corresponding need for membranes of greater flux rates which will satisfy the requirements of inland and brackish water requirements.

We have now discovered a new reverse osmosis membrane capable of both a high rejection and a high product flux.

Further though there is a large potential use of reverse osmosis membranes in the fields of water reclamation from polluted sources and in water reuse, the common cellulose acetate membrane does not reject a major pollutant, i.e. phenol. The films and membranes of the present invention will reject phenol.

SUMMARY OF INVENTION

Briefly, the present invention provides for a reverse osmosis membrane made from a copolymer of galactose methacrylate and methyl methacrylate by a casting procedure which includes forming a casting mix of the copolymer, solvent, and water, casting the mix on a smooth surface to form a film and immersing the film in a bath of water.

DESCRIPTION OF PREFERRED EMBODIMENTS

It has been recognized that the ability of polymeric materials to water swell effects the ability of such materials as reverse osmosis membranes. Since polymers having the correct degree of water swell are limited in number, a possible solution to the creation of new osmotic materials is to copolymerize a hydrophilic and a hydrophobic monomer. This solution to the problem presents the difficulty of copolymerizing polymers which are opposed in nature. Attempts to form hydrophobic-hydrophilic copolymers tend to result in the formation of large amounts of homopolymer. Consequently, the hydrophilic polymer, not being chemically attached to the hydrophobic polymer, is leached out by water during operation as as reverse osmosis membrane. This causes adverse changes in membrane properties with time.

To solve this dilemma, we first render the hydrophilic polymer temporarily hydrophobic by a conventional derivification process prior to copolymerization. A typical derivification process is disclosed in U.S. Pat. 2,680,735. After copolymerization the derivative groups are removed leaving the remainder of the copolymer unaffected. Applying this procedure to the production of methyl methacrylate-galactose methacrylate membrane methyl methacrylate, the hydrophobic monomer, is copolymerized with 1,2,3,4-di-O-isopropylidene, 6-O-methacryloyl-2-D-galactopyranose, the derivified hydrophilic monomer. Then, after the copolymer is formed, the product is deacetonated to give a methyl methacrylate-galactose methacrylate copolymer whose water uptake is determined by the ratio of the two monomers.

The water uptake for a galactose methacrylate-methyl methacrylate copolymer membrane is proportional to the amount of galactose methacrylate in the copolymer. For example, it has been found that in homogeneous membranes, a 10 mole percent of galactose methacrylate will give a 10 weight percent uptake of water upon immersion in water at 20° C. Correspondingly, 14.2 mole percent galactose methacrylate give a 14% water uptake and a 20% galactose methacrylate a 19% water uptake.

Homogeneous films were prepared from copolymers having different amounts of hydrophilic polymer to determine its salt rejection characteristics. These films were prepared by casting a 5 weight percent solution of the copolymer in equal volumes (1:1 v./v.) of ethanol and chloroform onto a smooth glass surface. The particular organic solvent used is not critical. The films were dried in vacuo to give a final thickness of about 20 microns. Three films were made having a galactose methacrylate mole percent of 10, 14.2 and 20 percent and were tested in a standard reverse osmosis cell at 1500 p.s.i. The rejection characteristics of these films are shown in Table 1 below.

TABLE 1

| Sample percent galactose methacrylate in copolymer | Thickness, microns | percent rejection water flux, gal./ft.²/day | Percent rejection NaCl from 1% soln. | Percent rejection MgSO₄ from 1% soln. |
|---|---|---|---|---|
| 10 | 14 | 0.08 | 97 | 98.7 |
| 14.2 | 19 | 0.36 | 91 | 99.5 |
| 20 | 20 | 0.62 | 73 | 98.9 |

As expected from the characteristics of prior art homopolymers, the rejection of sodium chloride decreases and the throughput of water increases as the membrane is made more hydrophilic. Also, like prior membrane materials, the present membranes reject divalent ions more easily than sodium ions, however the present materials maintain very good divalent ion salt rejection even with high hydrophilic content. Table 1 shows that by increasing the galactose methacrylate content from 10 to 20 mole percent the flux is increased from 0.08 to 0.62 gal./ft.²/day while the rejection of MgSO₄ remains essentially unchanged. Copolymers having as much as 33 mole percent galactose methacrylate may be formed. Beyond that point the copolymer becomes water soluble. The useful range of mole percent of galactose methacrylate in the copolymer for film formation is from 1 to 33 percent.

When asymmetric heterogeneous membranes are formed from a galactose methacrylate-methyl methacrylate copolymer it is necessary to modify the casting technique from that used in forming homogeneous films. To form an asymmetric membrane, a casting dope containing the copolymer, an organic solvent such as acetone, water and if desired a swelling agent is spread on a smooth surface to form a film. The particular organic solvent used is not critical though acetone is preferred. The film is then immersed into a bath of water and removed from the glass.

The amount of copolymer in the casting mix is preferably in the range of from 10 to 20 weight percent. At lower concentrations the casting time prior to immersion should generally be extended. Thus, casting of a 10 weight percent mix may extend 25 minutes whereas casting of a 20 weight percent mix is limited to 1 or 2 minutes.

In the formation of asymmetric membranes the amount of galactose methacrylate in the copolymer may be from 5 to 20 mole percent though a mole percent of about 10 is preferred. As previously described, copolymer of 10 mole percent gives a water uptake of about 10 weight percent upon immersion in water at 20° C.

Swelling agents which may be used include magnesium perchlorate, dimethyl formamide, and zinc chloride. When using the latter it is often desirable to add a small amount of HCl to the casting mix to prevent formation of zinc hydroxide in accordance with the disclosure of Office of Saline Water Research and Development Progress Report No. 213, page 19.

The following examples are illustrative of asymmetric membrane casting techniques.

EXAMPLE 1

A casing dope containing the following ingredients was prepared.

Weight percent:
   20 copolymer comprising: 10 mole percent galactose methacrylate and 90 mole percent methyl methacrylate.
   68 acetone.
   10 water.
   .2 zinc chloride.

This mixture was cast for 1 minute at 20° C. on a smooth glass surface to an initial thickness of 0.4 mm. It was then immersed into water at 15° C. and removed from the glass plate. When tested at 1500 p.s.i. this membrane has a product water flux at 44 gal./ft.²/day, a rejection of a 0.7% magnesium sulfate solution of 90% sodium chloride solution of 33%.

EXAMPLE 2

A casting dope having the following composition was prepared:

Weight percent
   20 copolymer comprising: 10 mole percent galactose methacrylate, 90 mole percent methyl methacrylate.
   69 acetone.
   10 water.
   1 magnesium perchlorate.

The same casting procedure was used as in Example 1. When tested at 1500 p.s.i. this membrane had a product flux of 4.1 gal./ft.²/day and a rejection for a 1.8% sodium chloride solution of 54%.

EXAMPLE 3

A casting dope having the following composition was prepared:

Weight percent
   20 copolymer comprising 7.7 mole percent galactose methacrylate, 92.3 mole percent methyl methacrylate.
   56 acetone.
   24 water.

The same casting procedure was used as in Example 1. When tested at 1500 p.s.i. this membrane had a product water flux of 3.5 gal./ft.²/day, a rejection of a 1% sodium chloride solution of 35% and a rejection of a 1% magnesium sulfate solution of 99%.

EXAMPLE 4

A casting dope containing the following ingredients was prepared:

Weight percent
   20 copolymer comprising 20 mole percent galactose methacrylate, 80 mole percent methyl methacrylate.
   52 acetone.
   28 water.

The same casting procedure was used as in Example 1. When tested at 150 p.s.i. this membrane had a product water flux of 5 gal./ft.²/day. At 1000 p.s.i. it had a rejection of 1% sodium chloride solution of 17% and a rejection of 10% magnesium sulfate solution of 56%.

EXAMPLE 5

A casting dope containing the following ingredients was prepared:

Weight percent
   10 copolymer comprising 10 mole percent galactose methacrylate, 90 mole percent methyl methacrylate.
   75 acetone.
   15 water.

The dope was cast for 25 minutes on a glass surface at an initial thickness of 0.4 mm. It was then immersed in water at 20° C. and removed from the glass plate.

When tested at 1500 p.s.i. this membrane had a product water flux of 3 gal./ft.²/day. At 1000 p.s.i. it had a rejection of a 1% sodium chloride solution of 65%.

A desirable characteristic of films and membranes formed from the galactose methacrylate-methyl methacrylate copolymer is their resistance to alkali. Whereas homogeneous films case from cellulose acetate having an initial sodium chloride rejection of 99% drop to 0% sodium chloride rejection after soaking in alkali at a pH of 12 for 72 hours at room temperature, galactose methacrylate-methyl methacrylate films derived from 14 mole percent galactose methacrylate copolymer and having an initial sodium chloride rejection of 89% drop to a final value of 78% rejection under the same extreme conditions. Acid has no detrimental effect on the films and membranes of the present invention. A 72 hour treatment at a pH of 1 has no effect on salt rejection.

Furthermore, it is well known that cellulose acetate membranes do not reject phenol. This seriously impairs their utility in the fields of water reuse and effluent treatment. Membranes and films of galactose methacrylate-methyl methacrylate are free from this effect. Thus, a film formed from a 10 mole percent galactose methacrylate copolymer maintained a 88% rejection of phenol in a solution having an initial concentration of phenol of 0.55% for a period of over 300 hours.

While the invention has been described in terms of the above examples, it is not intended to be limited thereto as various other alterations and modifications which are within the spirit and scope of the invention will become apparent to those skilled in the art.

What is claimed is:

1. A method of forming homogeneous reverse osmosis films comprising the steps of dissolving a galactose methacrylate-methyl methacrylate copolymer of from 1 to 33 mole percent galactose methacrylate in an organic solvent, casting said solution on a smooth surface and evaporating said solvent.

2. A method of forming asymmetric reverse osmosis membranes comprising the steps of forming a casting solution comprising 10 to 20 weight percent of a galactose methacrylate-methyl methacrylate copolymer consisting of from 5 to 20 mole percent galactose methacrylate, and acetone, and water, spreading said casting dope on a smooth surface, to form a film, immersing the film in water at a temperature of from about 15–20° C. and removing said film from said smooth surface.

3. The method of claim 2 wherein said casting solution contains a swelling agent selected from the group consisting of magnesium perchlorate, dimethyl formamide and zinc chloride.

4. The method of claim 3 wherein said copolymer consists of about 10 mole percent galactose methacrylate.

References Cited

UNITED STATES PATENTS

| | | | |
|---|---|---|---|
| 2,604,668 | 7/1952 | Miller et al. | 264—216 XR |
| 2,680,735 | 6/1954 | Fegley et al. | 260—86.1 |
| 3,103,508 | 9/1963 | Fisher et al. | 260—234 |
| 3,275,582 | 9/1966 | Black et al. | 260—17.4 |
| 3,331,772 | 7/1967 | Brownscombe et al. | |
| 3,332,894 | 7/1967 | Cantor et al. | 264—41 XR |
| 3,418,406 | 12/1968 | Ball | 264—216 XR |

OTHER REFERENCES

Bird, T. P. "Preparation and Derivatives of poly-(6-O-methacryloyl-d-galactose) and poly-(6-O-acryloyl-d-galactose)." In Journal Chemical Society ©, (London), 1966, pp. 1913–1918.

Saline Water Conversion Report for 1967, pp. 131–132, Black, W.A.P. "Polymerisable Monomers of 1,2:3,4-di-O-isopropylidene-α-d-galacto-pyranose." In Carbohydrate Research, 5 (1967) 362–365.

Black, W.A.P. "Monomer Reactivity Ratios in the Copolymerisation of 1,2:3,4-di-O-isopropylidene-6-O-methacryloyl-α-d-galactopyranose with Methyl Methacrylate." In Die Makromolekulare Chemie, 102 (1967) 266–268.

Black, W.A.P. "6-O-methacrylolyl-d-galactose: A Reactive, water-soluble monomer." In Die Makromolekulare Chemie, 117 (1968) 210–214.

PHILIP E. ANDERSON, Primary Examiner

U.S. Cl. X.R.

260—17.4, 234; 264—331